(12) United States Patent
Saito et al.

(10) Patent No.: US 6,269,294 B1
(45) Date of Patent: Jul. 31, 2001

(54) DRIVE CONTROL DEVICE FOR VEHICLE

(75) Inventors: Yoshiharu Saito; Takanori Kon, both of Wako (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 0 days.

(21) Appl. No.: 09/251,935

(22) Filed: Feb. 18, 1999

(30) Foreign Application Priority Data

Feb. 20, 1998 (JP) .................................................. 10-039369

(51) Int. Cl.$^7$ ...................................................... G06F 7/00
(52) U.S. Cl. ................................ 701/54; 701/85; 701/68; 477/906
(58) Field of Search .................................. 701/54, 51, 64, 701/67, 68, 85; 477/43, 86, 93, 114, 116, 117, 125, 133, 143, 144, 906

(56) References Cited

U.S. PATENT DOCUMENTS

| | | | | |
|---|---|---|---|---|
| 3,733,932 | * | 5/1973 | Uozumi et al. | 477/162 |
| 4,942,784 | * | 7/1990 | Okahara | 477/96 |
| 5,113,721 | * | 5/1992 | Polly | 701/54 |
| 5,957,808 | * | 9/1999 | Iizuka | 477/116 |

FOREIGN PATENT DOCUMENTS 5-118435  5/1993  (JP) .

* cited by examiner

*Primary Examiner*—William A. Cuchlinski, Jr.
*Assistant Examiner*—Edward Pipala
(74) *Attorney, Agent, or Firm*—Armstrong, Westerman, Hattori, McLeland & Naughton, LLP

(57) ABSTRACT

A drive control device is provided for a vehicle which has an automatic transmission and which is capable of setting a throttle opening independently of an accelerator opening. Herein, the drive control device detects a shift range and an engine speed, based on which prescribed controls are made with regard to a throttle and a clutch. That is, if the engine speed is higher than a predetermined engine speed value when the shift range is changed over from a non-running range (e.g., N range) to a running range (e.g., D range), the drive control device controls the throttle opening substantially in a fully closed state while controlling clutch oil pressure of a start-mode-engaged gear to be set at a predetermined oil pressure value which is greater than zero and at which the clutch does not have a torque transmission capacity. In addition, in a predetermined time after the engine speed becomes lower than the predetermined engine speed value, the drive control device maintains the throttle opening in the fully closed state while gradually increasing the clutch oil pressure of the start-mode-engaged gear so as to control the clutch to start an engagement operation. Thus, it is possible to ease an engagement shock of the clutch which occurs when the driver changes gears from the N range to the D range while depressing the accelerator pedal.

2 Claims, 6 Drawing Sheets

DRIVE CONTROL DEVICE FOR VEHICLE

BACKGROUND OF THE INVENTION

1. Field of the Invention

This invention relates to drive control devices provided for vehicles having automatic transmission for changing gears in response to shift ranges.

2. Description of the Related Art

Generally, vehicles (e.g. cars) are equipped with automatic transmission for changing gears in response to shift ranges such as the non-running range and running range, each of which is appropriately selected by a driver. At a shift mode to change gears from the non-running range to the running range, a driver of the vehicle inevitably feels a start shock in running.

The vehicle equipped with the automatic transmission, which is disclosed by the paper of Japanese Patent Application, Publication No. Hei 5-118435, for example, operates as follows:

At a start mode, the shift range is changed from the neutral range (i.e., N range) to the drive range (i.e., D range). Therefore, oil pressure is applied to the clutch of the gear which is selectively engaged at the start mode, so that the clutch is put in an engaged state. Thus, drive force of the engine is transmitted to the wheels via the engaged gear at the start mode. Normally, the driver depresses the accel (or accelerator pedal) to start the vehicle after changing the gears from the N range to the D range.

In some case, there occurs a situation due to carelessness of the driver that the driver depresses the accelerator pedal in the N range but the drive changes gears from the N range to the D range while depressing the accelerator pedal. For instance, such a situation occurs as follows.

The driver does not take notice of a fact that the shift range is presently placed in the N range but watches another vehicle, parked in front of the driver's vehicle, to suddenly start running. In that case, the driver depresses the accelerator pedal in a fluster, then, the driver realizes that the present shift range is the N range, so that the driver changes over the shift range from the N range to the D range.

In the aforementioned situation, engagement of the clutch is made under a condition that the engine speed is high. So, there occurs a problem that an engagement shock becomes large. The technology disclosed in the aforementioned paper suffers from such a problem as well.

SUMMARY OF THE INVENTION

It is an object of the invention to provide a drive control device which is capable of easing an engagement shock of a clutch of a vehicle when a driver changes gears from the N range to the D range.

A drive control device of this invention is provided for a vehicle which has an automatic transmission and which is capable of setting a throttle opening independently of an accelerator opening. Herein, the drive control device detects a shift range selected by the automatic transmission and an engine speed, based on which prescribed controls are made with regard to a throttle and a clutch.

Namely, if the engine speed is higher than a predetermined engine speed value when the shift range is changed over from a non-running range (e.g., N range) to a running range (e.g., D range), the drive control device controls the throttle opening substantially in a fully closed state, regardless of the accelerator opening, while it also controls clutch oil pressure of a start-mode-engaged gear to be set at a predetermined oil pressure value which is greater than zero and at which the clutch does not have a torque transmission capacity.

The drive control device waits for an event that the engine speed is sufficiently reduced, then, the drive control device increases the clutch oil pressure to control the clutch in an engaged state. Therefore, it is possible to avoid a progression in engagement of the clutch under the condition where the engine speed is high, so it is possible to avoid occurrence of an engagement shock of the clutch.

Concretely speaking, for example, if the driver depresses the accelerator pedal in the N range but changes gears from the N range to the D range while depressing the accelerator pedal, the drive control device makes a control in such a way that the engine speed is reduced, regardless of depression of the accelerator pedal. Then, when the engine speed is reduced to some extent, the drive control device starts an engagement operation of the clutch. For this reason, engagement of the clutch is performed under the condition where the engine speed is low, so it is possible to ease the engagement shock of the clutch.

Besides, in a predetermined time after the engine speed becomes lower than the predetermined engine speed value, the drive control device maintains the throttle opening in the fully closed state while gradually increasing the clutch oil pressure of the start-mode-engaged gear so as to control the clutch to start an engagement operation.

In other words, at the timing when the throttle opening is place in the fully closed state so that the engine speed becomes lower than the predetermined engine speed value, the driver control device gradually increases the clutch oil pressure of the start-mode-engaged gear so that the clutch performs the engagement operation. In the predetermined time counted from the above timing, the drive control device maintains the throttle opening in the fully closed state, so that the engine speed is sufficiently reduced. Such controls are required to avoid occurrence of control hunting, which is caused to occur as follows.

If the clutch oil pressure is increased while the throttle opening is simultaneously restored to the original value (i.e., normal value corresponding to the accelerator opening) under the condition that the engine speed is not sufficiently reduced, the engine speed increases before the clutch has a torque transmission capacity, which causes occurrence of hunting on control of the vehicle.

Incidentally, as the aforementioned predetermined time, it is possible to set a time that brings the clutch to have the torque transmission capacity or so.

BRIEF DESCRIPTION OF THE DRAWINGS

These and other objects, aspects and embodiment of the present invention will be described in more detail with reference to the following drawing figures, of which.

DESCRIPTION OF THE PREFERRED EMBODIMENT

This invention will be described in further detail by way of examples with reference to the accompanying drawings.

Figure 1:
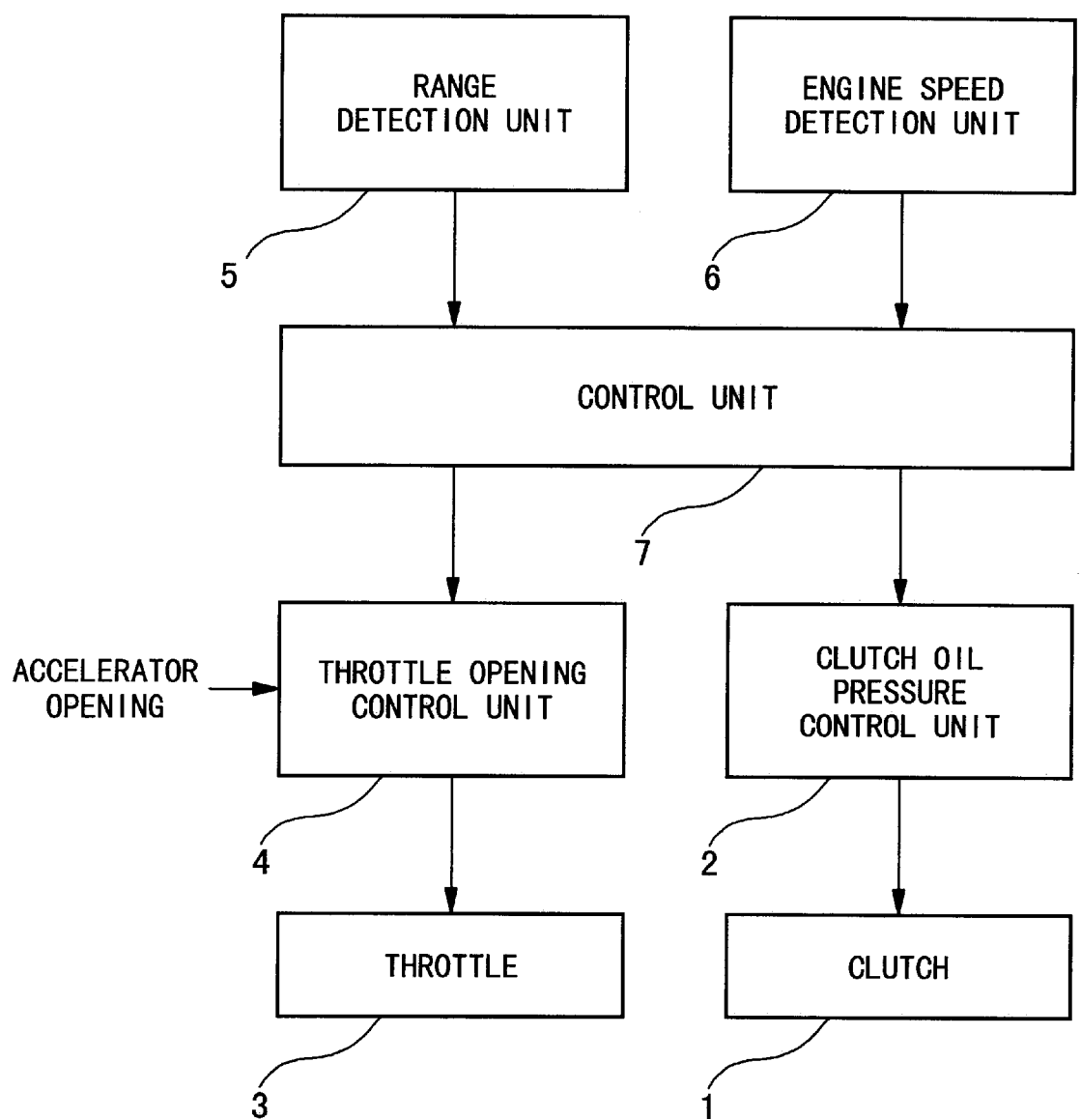
FIG. 1 is a block diagram showing a configuration of a drive control device for a vehicle in accordance with an embodiment of the invention.

With reference to FIG. 1, a description will be given with respect to a configuration of a drive control device for a vehicle in accordance with an embodiment of the invention.

The drive control device of FIG. 1 is equipped with a clutch oil pressure control unit 2 for controlling oil pressure of a clutch 1 of an engaged gear at a start mode (hereinafter, referred to as a start-mode-engaged gear) in an automatic transmission as well as a throttle opening control unit 4 for controlling an opening of a throttle 3 of an engine (not shown). Normally, the throttle opening control unit 4 controls the throttle opening to be in proportion to an accelerator opening. According to needs, however, the throttle opening control unit 4 is capable of controlling the throttle opening to vary independently of the accelerator opening.

The drive control device is further equipped with a range detection unit 5 for detecting a shift range position selected by a driver, an engine speed detection unit 6 and a control unit 7. Herein, the control unit 7 supplies the throttle opening control unit 4 and the clutch oil pressure control unit 2 with control signals which are produced in response to signals output from the range detection unit 5 and the engine speed detection unit 6 respectively.

Suppose an event that the range detection unit 5 detects a change of the shift range position from the non-running range to the running range. In such an event, if an engine speed is greater than a prescribed engine speed value, the control unit 7 sets the throttle opening at a full close state while setting the clutch oil pressure of the start-mode-engaged gear at a prescribed value that the clutch has no torque transmission capacity (or torque transmission capability). In a predetermined period of time from the timing when the engine speed becomes lower than the prescribed engine speed value because of the full close state of the throttle opening, the control unit 7 maintains the full close state of the throttle opening while gradually increasing the clutch oil pressure of the start-mode-engaged gear to start an engagement operation of the clutch 1. After an elapse of the predetermined period of time, the control unit 7 sets the throttle opening at a prescribed limit value, which is greater than zero, until the start-mode-engaged gear has a torque transmission capacity.

Figure 2:
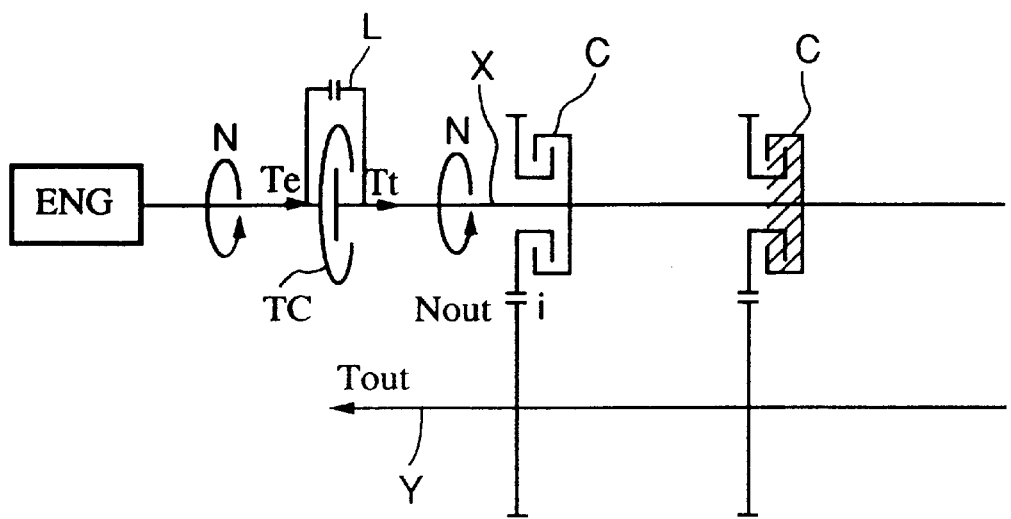
FIG. 2 is a schematic diagram showing a simplified construction of a drive force transmission system employed for the vehicle.

Now, a construction of a drive force transmission system of the vehicle to which the present embodiment is applied will be simply described with reference to FIG. 2. The drive force transmission system of FIG. 2 is of a parallel-two-shaft type. Herein, engine drive force produced by an engine (ENG) is transmitted to a transmission input shaft X via a torque converter TC and a lockup clutch L. From the transmission input shaft X, the engine drive force is transmitted to a transmission output shaft Y via a clutch C. In FIG. 2, Tt designates turbine torque; Tout designates output torque; Nout designates an output shaft rotation speed; and i designates a gear ratio.

Next, contents of processing of the control unit 7 will be described with reference to flowcharts of FIG. 3 and FIG. 4 and a time chart of FIG. 5 as well as a characteristic graph of FIG. 6. When the control unit 7 determines based on a detection signal given from the range detection unit 5 that a driver changes gears from the N range (i.e., non-running range) to the D range (i.e., running range), the control unit 7 starts to execute a control process shown in FIG. 3.

Figure 3:
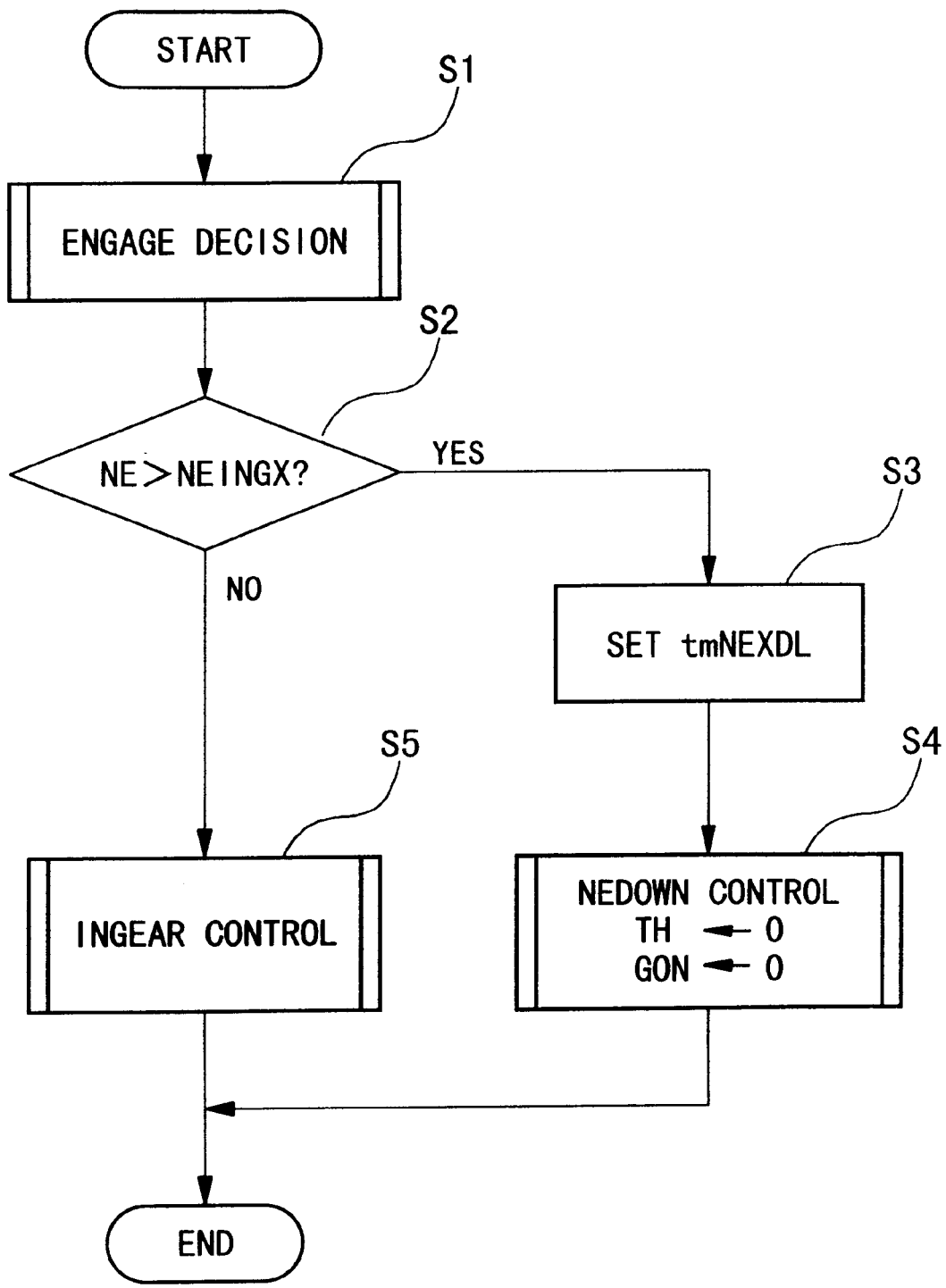
FIG. 3 is a flowchart showing a control process executed by a control unit shown in FIG. 1.

In the control process of FIG. 3, the control unit 7 makes an engagement decision (or ENGAGE decision) as to whether the clutch of the start-mode-engaged gear is engaged or not in step S1. In step S2, the control unit 7 checks an engine speed NE. If the engine speed NE is under a predetermined value NEINGX, in other words, if the present engine speed is not so high, the control unit 7 transfers control from step S2 to step S5 to perform in-gear control (or INGEAR control). On the other hand, if the engine speed NE is greater than the predetermined value NEINGX, in other words, if the present engine speed is abnormally high since the driver depresses the accelerator pedal deeply with the N range, the control unit 7 transfers control from step S2 to step S3 to set a timer tmNEXDL. Then, the control unit 7 proceeds to step S4 to perform engine speed down control (or NEDOWN control).

The aforementioned predetermined value NEINGX corresponds to an engine speed when the driver depresses the accelerator pedal deeply with the N range (or non-running range). In other words, NEINGX corresponds to an engine speed at which it is predicted that a shock occurs when the driver manipulates the shift lever while the clutch engagement is made. Specifically, the predetermined value NEINGX is set at 3000 rpm., for example.

Figure 5:
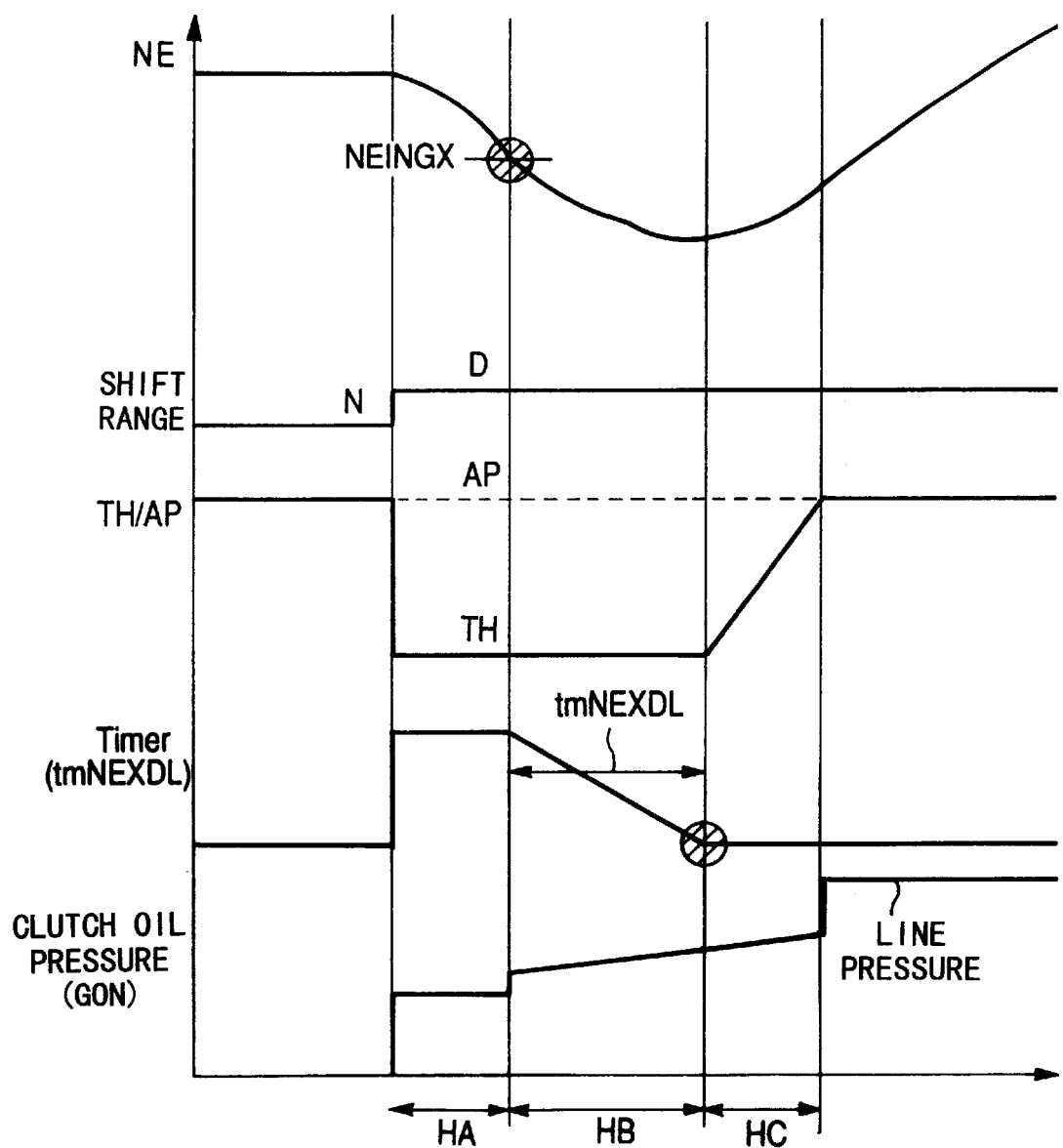
FIG. 5 is a time chart showing a manner of drive control that the drive control device performs in accordance with procedures shown in FIG. 3 and FIG. 4.
Figure 6:
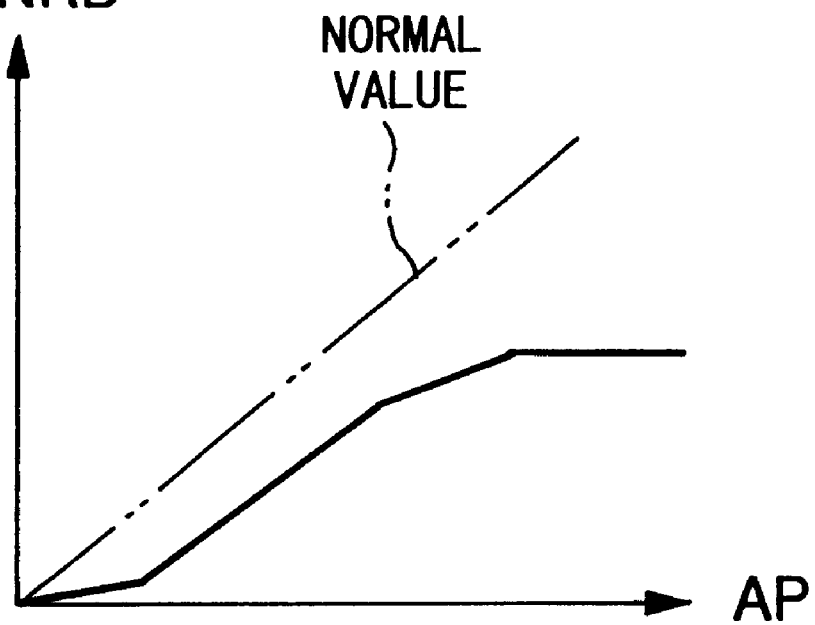
FIG. 6 is a graph showing a characteristic curve representing content of a map used for setting timer values.

In a time range HA shown in FIG. 5, the engine speed down control is made such that a throttle opening TH is set at "0" representing a full close state, regardless of an accelerator opening AP. At the same time, clutch oil pressure QON of the start-mode-engaged gear is set at a predetermined value that the clutch has no torque transmission capacity.

As the predetermined value that the clutch has no torque transmission capacity, it is possible to employ a learned value which is obtained through learning in advance. Such a learned value can be obtained through experiments as follows:

For example, the clutch oil pressure is gradually increased while measurement is performed on the input rotation speed and output rotation speed of the clutch. If the clutch has no torque transmission capacity, the ratio of the rotation speeds is unchanged as compared with the case where the clutch oil pressure is zero. However, when the clutch has a little torque transmission capacity, the ratio should be changed correspondingly. So, the learning is made with respect to the clutch oil pressure that the ratio of the rotation speeds of the clutch changes, so that the learned value is established and is stored as the aforementioned predetermined value. Herein, some margins are set for the learning of the clutch oil pressure just before a change occurs on the rotation speeds of the clutch. Because, it is necessary to set the clutch oil pressure that the torque transmission capacity is certainly zero in consideration of the dispersion in individual characteristics of clutches as well as influence due to viscosity of oil (which depends on temperature of oil).

In the time range HA shown in FIG. 5 where NE>NEINGX, the control unit 7 sequentially performs steps in an order as follows:

Step S2→Step S3→Step S4.

When the engine speed NE is made under NEINGX due to the full close control of the throttle opening, the control unit 7 proceeds to step S5 from step S2. At this time, the clutch oil pressure is subjected to step increase (i.e., increase of 20% to 30%), so that the drive control device proceeds to a time range HB shown in FIG. 5. Reasons why the clutch oil pressure is subjected to step increase just before the drive control device proceeds to the time range HB are as follows:

The aforementioned learned value corresponding to the oil pressure of the clutch having no torque transmission capacity is set to include some margins. Herein, it is confirmed in advance through experiments that no shock occurs due to the engagement of the clutch even if 20–30% of the aforementioned predetermined value is added to the clutch oil pressure as the step increase under the condition that the engine speed is sufficiently reduced. To reduce the time for completion of the engagement of the clutch, it is preferable to increase the clutch oil pressure by the step increase.

Figure 4:
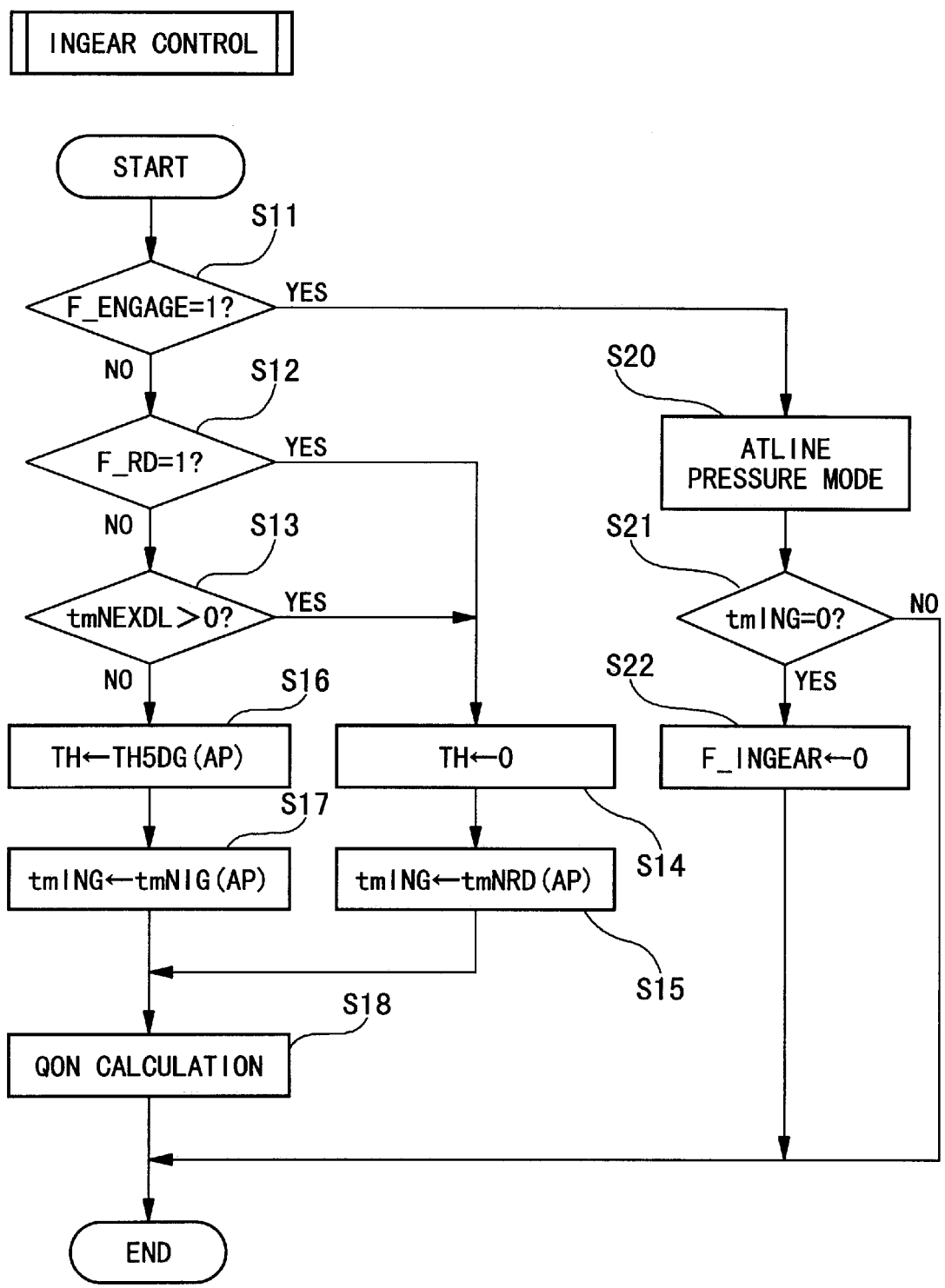
FIG. 4 is a flowchart showing details of INGEAR control of step S5 shown in FIG. 3.

In the INGEAR control of step S5, the control unit 7 performs an in-gear control process shown in FIG. 4. In step Sil of the in-gear control process, a decision is made as to whether "1" is set to an engagement flag F_ENGAGE representing an engaged state of the clutch or not. Herein, if the clutch is placed in the engaged state, the flag F_ENGAGE is set at "1". If not, the flag F_ENGAGE remains at "0", so the control unit 7 transfers control from step S11 to step S12. In step S12, a decision is made as to whether "1" is set to a RD flag F_RD or not. Herein, the flag F_RD is set at "1" when the driver changes gears from the R range to the D range or from the D range to the R range. If "YES" in step S12, the control unit 7 proceeds to step S14. If "NO", the control unit 7 proceeds to step S13 wherein a decision is made as to whether the aforementioned timer tmNEXDL is presently counting time or not. In other words, a decision is made as to whether tmNEXDL is greater than "0" or not. If the timer is presently counting time, in other words, if "YES" in step S13. the control unit 7 proceeds to step S14. Incidentally, the time counted by the timer tmNEXDL is required to sufficiently reduce the engine speed by the throttle opening, in other words, such time is required to reduce the engine speed sufficiently such that the clutch gradually starts engagement without causing a shock to occur. In the aforementioned time, the vehicle is capable of maintaining the reduced engine speed to some extent in such a way that the clutch starts the engagement but hunting does not occur on drive control of the vehicle.

In step S14, the control unit 7 maintains the throttle opening at "0". In next step S15, a predetermined value tmNRD(AP) is set to a transition timer tmING. As the predetermined value tmNRD(AP) which depends on the accelerator opening AP, it is possible to use a map value which is registered with a characteristic map whose content is determined in advance in accordance with a characteristic curve shown in FIG. 6. Then, the control unit 7 transfers control from step S15 to step S18. In step S18, the control unit 7 calculates clutch oil pressure QON, so that the actual clutch oil pressure is controlled to conform with the calculated value of the clutch oil pressure QON. In this case, the clutch oil pressure QON is gradually increased so that the clutch will gradually reach an engagement level.

As described above, the control unit 7 waits for a predetermined time set to the timer tmNEXDL until the engine speed is sufficiently reduced by compelling the throttle opening TH to be zero. When the timer tmNEXDL completes counting the predetermined time, the decision of step S13 results in "NO", so that the control unit 7 proceeds to step S16. In step S16, the control unit 7 does not sustain the throttle opening TH at the full close state, while the control unit 7 does not restore the throttle opening TH to the normal value corresponding to the accelerator opening. Namely, the control unit 7 suppresses the throttle opening TH to be in a range of limited values which are lower than the normal value. This is shown by a time range HC shown in FIG. 5.

In other words, as the throttle opening TH, the control unit 7 sets a limitation value TH5DG which responds to the accelerator opening AP but which is controlled not to be greater than the normal value.

The limitation value TH5DG provides prevention against occurrence of an event that the driver mistakenly further depresses the accelerator pedal under the condition where the engine speed is not increased due to the suppressed throttle opening which is zero, regardless of the accelerator operation. Such a prevention is made by producing sound corresponding to an increase of the engine speed (hereinafter, referred to as engine speed increase sound). So, the limitation value TH5DG should be one that is capable of informing the driver of the situation that the engine speed follows the accelerator operation by the engine speed increase sound. To accomplish such a control, it is necessary to provide a small degree of the throttle opening which is 5 degree or under. Due to such a control, even if the driver suddenly depresses the accelerator pedal, there is provided a limitation in increase of the throttle opening. For this reason, the engine speed does not increase rapidly, while the driver may feel only the engine speed increase sound. As a result, it is possible to prevent the driver from imparting rash depression to the accelerator pedal without giving the driver an unpleasant feeling. As the limitation value TH5DG, it is possible to use the map value which follows the accelerator opening AP as shown in FIG. 6.

In step S17, a predetermined value tmNIG(AP) is set to the transition timer tmING. As the predetermined value tmNIG(AP) which depends on the accelerator opening AP, it is possible to use the map value which is set in advance as shown in FIG. 6. Then, the control unit 7 transfers control from step S17 to S18. In step S18, the control unit 7 calculates clutch oil pressure QON, so that the control unit 7 controls the actual clutch oil pressure to be at the calculated value. Herein, the clutch oil pressure QON is gradually increased until it comes to the timing that a relationship between the accelerator opening and throttle opening is restored to an original one. At this timing, there is established a state that sufficient torque transmission is made by means of the clutch, in other words, a state that the clutch is sufficiently engaged. In such a state, even if the clutch oil pressure is further increased to the line pressure, the torque transmission capacity is substantially unchanged so that no shock occurs.

Until the engagement flag F_ENGAGE becomes equal to "1", the control unit 7 performs a series of steps in an order as follows:

Step S11→Step S12→Step S13→Step S16→Step S17→Step S18.

When it is confirmed that the engagement flag F_ENGAGE is set at "1", the control unit 7 transfers control from step S11 to step S20. In step S20, the clutch oil pressure is set at an ATLINE pressure mode representing the line pressure. Then, the control unit 7 proceeds to step S22 after waiting for an event that a value of the timer tmING becomes equal to zero in step S21. In step S22, the control unit 7 resets an in-gear flag F_INGEAR to end the process of FIG. 4.

As described heretofore, it is possible to summarize the operations of the drive control device of the present embodiment as follows:

If the engine speed is relatively large at the timing when the driver changes gears from the N range to the D range, the drive control device controls the throttle opening TH to be zero, regardless of the accelerator opening AP, while it also controls the clutch oil pressure QON to be zero simultaneously. Then, the drive control device waits for the predetermined time set to the timer tmNEXDL until the engine speed NE drops. Thereafter, the drive control device gradually increases the clutch oil pressure QON to establish a fully engaged state of the clutch. Until the clutch is completely placed in the fully engaged state, the drive control device controls the throttle opening TH by a limitation that the driver is capable of recognizing the accelerator operation by the engine sound. Herein, the throttle opening TH is suppressed until engagement of the clutch is confirmed. At the timing of the engagement of the clutch, the drive control device restores the throttle opening to the normal value corresponding to the accelerator opening.

Therefore, it is possible to avoid occurrence of engagement of the clutch under the situation that the engine speed NE is high when the driver changes gears from the N range to the D range. Thus, it is possible to avoid occurrence of an engagement shock, namely, a start shock of the vehicle. After elapse of the predetermined time tmNEXDL, the drive control device increases the clutch oil pressure. In this stage, however, the drive control device still maintains the throttle opening in the fully closed state. Thus, it is possible to avoid occurrence of control hunting. In a duration that the engagement of the clutch is established after elapse of the predetermined time tmNEXDL, the limitation value TH5DG depending on the accelerator opening is set to the throttle opening TH. So, as compared with the technique that the throttle opening TH is placed in the fully closed state in the above duration, the drive control device of the present embodiment is capable of giving the driver a feeling of connections established between the accelerator and throttle by the engine sound. Thus, it is possible to avoid occurrence of an event that the driver mistakenly further depresses the accelerator pedal. For this reason, it is possible to improve drivability in driving of the vehicle.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds are therefore intended to be embraced by the claims.

What is claimed is:

1. A drive control device for a vehicle which has an automatic transmission and which is capable of setting a throttle opening independently of an accelerator opening, said drive control device comprising:

range detection means for detecting a shift range presently selected by the automatic transmission;

engine speed detection means for detecting engine speed; and control means for if the engine speed detection means detects a state that the engine speed is higher than a predetermined engine speed value when the range detection means detects a changeover of the shift range which is changed over from a non-running range to a running range, controlling the throttle opening at a fully closed state regardless of an accelerator pedal opening while controlling clutch oil pressure of a start-mode-engaged gear to be set at a predetermined oil pressure value which is greater than zero and at which a clutch does not have a torque transmission capacity.

2. A drive control device for the vehicle according to claim 1, wherein in a predetermined time after a timing that the engine speed detection means detects that the engine speed becomes lower than the predetermined engine speed value from the state that the engine speed is higher than the predetermined engine speed value, the control means maintains the throttle opening in a fully closed state while gradually increasing the clutch oil pressure of the start-mode-engaged gear from the predetermined oil pressure value and controlling the clutch to start an engagement operation.

* * * * *